April 23, 1963 R. W. FOSTER-PEGG 3,086,362
COMBINED STEAM-GAS TURBINE PLANT
Filed Nov. 29, 1957
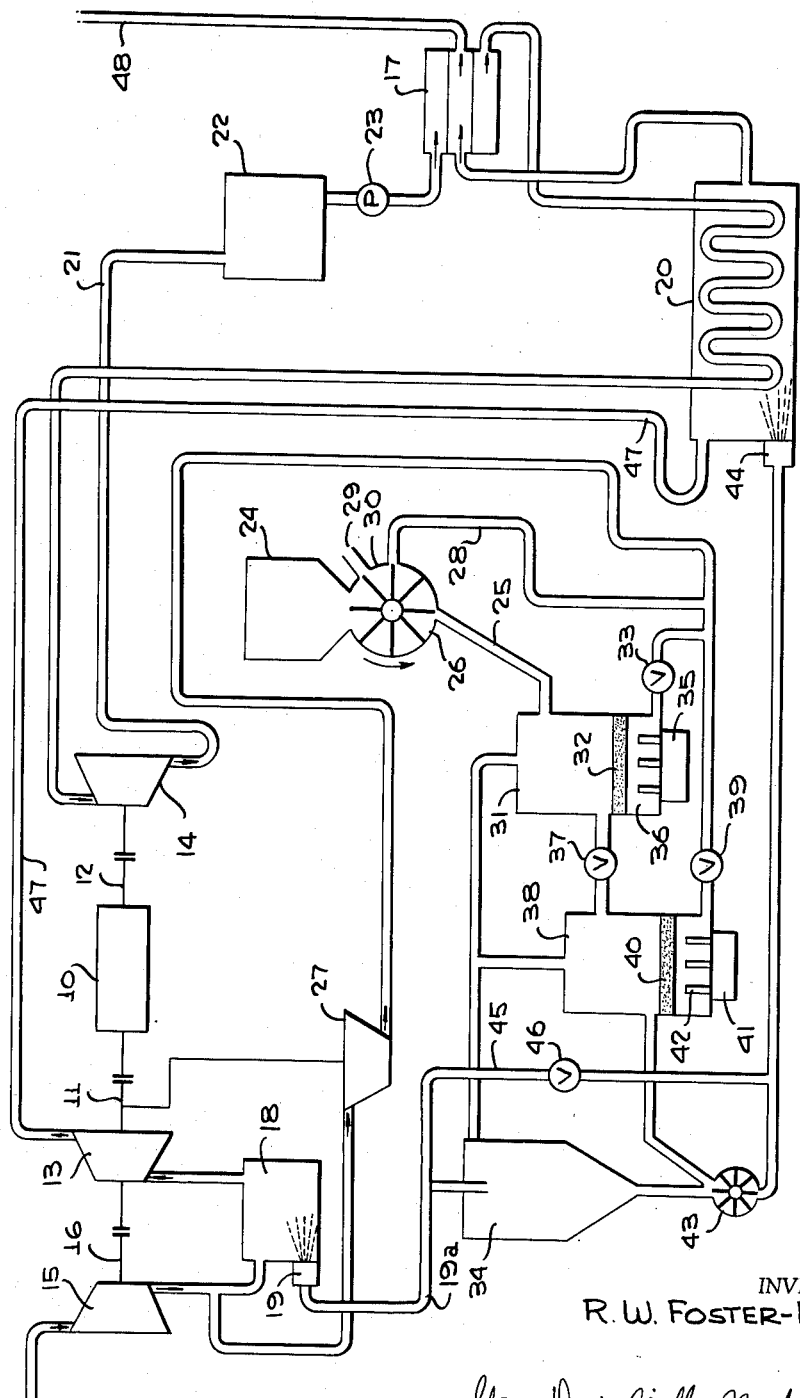
INVENTOR
R. W. FOSTER-PEGG
BY Stevens, Davis, Miller & Mosher
ATTORNEYS

United States Patent Office 3,086,362
Patented Apr. 23, 1963

3,086,362
COMBINED STEAM-GAS TURBINE PLANT
Richard W. Foster-Pegg, Burnt Hills, N.Y., assignor to Her Majesty the Queen in the right of Canada as represented by the Minister of Mines and Technical Surveys, Ottawa, Ontario, Canada
Filed Nov. 29, 1957, Ser. No. 699,620
1 Claim. (Cl. 60—39.18)

This invention relates to a combined steam-gas turbine plant for deriving useful energy which can be used to generate power or for similar purposes from fuel such as coal.

An object of this invention is to provide a combined steam-gas turbine plant having a high thermal efficiency.

A further object of this invention is to provide a combined steam-gas turbine plant capable of efficiently utilizing the potential energy values of coal or other non premium fuel while avoiding problems of erosion and deposition of ash in the turbine resulting from the conventional direct coal fired simple gas turbine.

Another object of this invention is to provide a plant in which additional thermal efficiency is achieved at the expense of a relatively slight or no increase in capital cost.

An additional object of this invention is to provide a plant which is adapted to burn wholly non premium ash bearing fuel.

In accordance with this invention fuel which is preferably coal but which may also be residual oil is separated into two portions, namely a volatile portion and a residue. Where the fuel is coal a carbonizer is used to separate the fuel into volatiles and a residue consisting of char and ash. Where the fuel is an oil an integral gasifier boiler is used to separate the fuel to a vapour or gas and a residue with a higher boiling point than the original oil or a carbon residue. The volatile portion is immediately and without significant heat loss used to drive a gas turbine. The char or residue is used to generate steam in a steam boiler to drive a steam turbine. This char is burnt in an atmosphere provided by the exhaust gas from the gas turbine, thereby fully utilizing the heat content of the exhaust gas. The problems of handling, recovering and purifying tars in conventional carbonization processes are avoided since the volatiles driven from the coal are conveyed to the gas turbine in the heated state so that none of the sensible heat of the volatiles will be lost and no tars will be deposited. The carbonizer is operated at a pressure sufficiently in excess of the gas turbine pressure to enable residues such as dust and char to be removed in conventional separators. Thus residues that might damage the turbine are eliminated. The char and the dust are directed to the steam boiler where solids will not be objectionable.

Where carbonization is referred to in the accompanying description it is intended to refer to the driving off of volatiles from the coal without gasifying or driving off a large proportion of the fixed carbon as carbon monoxide. However, a certain amount of gasification is usually involved in carbonization procedures and this is not excluded provided that the main products are volatiles and char. Although it is primarily contemplated that each of the components produced from the coal be used as fuel, the inclusion of provision to recover a small proportion of bye products is not intended to be excluded. Thus it may be possible to recover high value bye products without encountering the difficulties and expense attendant on previous attempts to derive bye products from a large proportion of the volatiles or char.

In the drawing which illustrates the preferred embodiment of this invention:

The figure illustrates a power plant in accordance with this invention. Referring now to FIGURE 1 of the drawings an electric generator 10 is driven through shafts 11 and 12 respectively by gas turbine 13 and steam turbine 14. A gas turbine compressor 15 is also driven by gas turbine 13 through shaft 16 to supply compressed air to combustion chamber 18. Part of this compressed air combines with fuel gas injected at burner 19 through conduit 19a to supply after ignition of the fuel, products of combustion which are mixed with the remainder of the compressed air to drive gas turbine 13. In other words, after initiation of combustion, the fuel gas burns continuously in some of the air from the compressor 15 to produce hot gas consisting of hot products of combustion and excess air which expands through the turbine 13 to produce power.

Steam turbine 14 is driven by steam generated in boiler 20. The return steam line 21 is directed to condenser 22 which produces a condensate to be returned to boiler 20 by feed pump 23.

The fuel for the gas turbine and steam turbine is supplied by a carbonizer assembly including service coal bins 24 from which coal is supplied through conduit 25 by lock hoppers or rotary feeder 26 which may be of the type shown in Sedille, U.S. Patent 2,592,749 by compressed air from the gas turbine compressor 15 and auxiliary compressor 27 which is fed through pipe 28 and ejects the coal from rotary feeder 26. The compressed air is provided because the coal is being injected into a pressurized system. A vent 29 releases the pressure within the pockets 30 of the rotary feeder after discharge of the coal. Conduit 25 feeds the coal to a pretreater 31 in which the coal is fluidized by high pressure air derived from auxiliary compressor 27, and directed through pressure plate 32. Valve 33 controls the flow of fluidizing air into the pretreater 31. The coal passing into pretreater 31 mixes with partially devolatilized coal and is dried and heated to about 700° to 800° F. so as to preoxidize the coal and render it non agglomerating. Part of the volatiles are extracted from the coal in the pretreater and are directed to dust separator 34 which may be of the conventional cyclone type. The heat for the pretreatment step is supplied mainly by internal combustion in the fluidized bed augmented by the heat of the inlet air. A starting heater 35 having heating elements 36 is used to initiate the combustion. It will be appreciated that the heat for starting can be supplied in any convenient manner provided that the heater is effective to raise the temperature of the fluidized coal to the value required to initiate internal combustion. The preoxidized coal passes through control valve 37 to carbonizer 38 where air controlled by valve 39 and obtained from auxiliary compressor 27 is passed through porous pressure plate 40 to provide fluidization. A starting heater 41 having heating elements 42 initiates the carbonization which is then maintained by the heat of internal combustion combined with the sensible heat of the air supplied to the carbonizer. The temperature within carbonizer 38 should be maintained within the range 1100–1500° F. as compared with conventional low temperature carbonizer temperatures of about 1000° F. so that the carbonizer together with the pretreater should drive off about three-quarters of the volatile in the coal as compared with about half of the volatiles driven off during conventional low temperature carbonization. Gas turbine compressor 15 preferably operates at a pressure ratio of about 1:4 to 1:6 to produce a pressure of about 60 to 90 p.s.i. absolute and auxiliary compressor 27 has a pressure ratio of about 1:1½ to 1:2 to give a pressure of about 90 to 180 p.s.i. absolute in carbonizer 38.

The volatiles produced in carbonizer 38 pass to dust collector 34 and are then directed, together with the volatiles from pretreater 31 to burner 19 where they supply fuel for the combustion chamber 18 for gas turbine 13. The char from carbonizer 38, together with dust from dust collector 34 passes through rotary valve 43 and conduit 44a to provide fuel for the burner 44 of boiler 20. A bypass 45 controlled by valve 46 directs volatiles in excess of the requirements of the gas turbine to burner 44 or to a separate gas burner, thereby giving flexibility of control. The exhaust gas from gas turbine 13 consisting mostly of air in excess of the requirements of the fuel gas burned in the gas turbine is directed by conduit 47 to boiler 20 to afford an atmosphere for the combustion of fuel by burner 44 and thereby recovering the sensible heat and any residual heating values in the gas turbine exhaust. The exhaust from boiler 20 passes to stack 48 through economizer 17.

I claim:

A power plant comprising a gas turbine assembly including a gas turbine, a combustion chamber for the gas turbine and a gas turbine compressor for compressing air for said gas turbine, a steam turbine assembly including a steam turbine and a boiler to generate steam for said steam turbine, means to direct exhaust gases of said gas turbine to said boiler to provide a combustion atmosphere for said boiler, a carbonizer assembly adapted to separate coal into a volatile component and a char comprising carbon and the ash content of said coal, means for conveying at least part of said volatile component to said combustion chamber to provide fuel for said combustion chamber and means for conveying said char to said boiler to provide fuel for said boiler and control means for combining a proportion of said volatile component in excess of the requirements of said gas turbine assembly with the char directed to said boiler.

References Cited in the file of this patent

UNITED STATES PATENTS

| | | |
|---|---|---|
| 2,496,407 | Pfenninger | Feb. 7, 1950 |
| 2,520,967 | Schmitt | Sept. 5, 1950 |
| 2,592,749 | Sedille et al. | Apr. 15, 1952 |
| 2,663,144 | Nordstrom et al. | Dec. 22, 1953 |
| 2,687,950 | Kalbach | Aug. 31, 1954 |
| 2,729,552 | Nelson et al. | Jan. 3, 1956 |
| 2,729,597 | Garbo | Jan. 3, 1956 |
| 2,805,188 | Josenhans | Sept. 3, 1957 |